(12) United States Patent
Phuyal et al.

(10) Patent No.: US 6,571,195 B2
(45) Date of Patent: May 27, 2003

(54) METHOD FOR CALCULATING DISTANCE USING PIECE-WISE LINEAR INTERPOLATION

(75) Inventors: Bishnu P. Phuyal, DesPlaines, IL (US); Nicholas E. Smith, Birmingham (GB)

(73) Assignee: Navigation Technologies Corporation, Chicago, IL (US)

( * ) Notice: Subject to any disclaimer, the term of this patent is extended or adjusted under 35 U.S.C. 154(b) by 0 days.

(21) Appl. No.: 09/911,890

(22) Filed: Jul. 24, 2001

(65) Prior Publication Data

US 2003/0036880 A1 Feb. 20, 2003

(51) Int. Cl.$^7$ ............................................... G06F 15/00
(52) U.S. Cl. ........................ 702/158; 702/150; 701/214
(58) Field of Search ........................... 340/995; 33/104; 701/23, 36, 41, 72, 200, 207, 210, 213, 214, 215, 221; 702/14, 36, 41, 56, 73, 93, 142, 150, 158, 176, 190

(56) References Cited

U.S. PATENT DOCUMENTS

| | | | |
|---|---|---|---|
| 5,614,913 A | | 3/1997 | Nichols et al. |
| 5,850,624 A | * | 12/1998 | Gard et al. ................... 33/356 |
| 5,978,744 A | | 11/1999 | McBride |
| 5,986,604 A | | 11/1999 | Nichols et al. |
| 6,092,022 A | | 7/2000 | McBride |
| 6,335,695 B1 | | 1/2002 | Kawasaki ................... 340/995 |

OTHER PUBLICATIONS

Bowditch, American Pratical Navigator, 1958, U.S. Navy Hydrographic Office, Tables 6 and 31.*
Horowitz and Hill, The Art of Electronics, 1993, Cambridge University Press, p. 816.*
Rapp, Richard H.: *Geometric Geodesy Part 1*, The Ohio State University, pp. 114–115 (Apr. 1991).

* cited by examiner

*Primary Examiner*—John Barlow
*Assistant Examiner*—Stephen J. Cherry
(74) *Attorney, Agent, or Firm*—Jon D. Shutter; Frank J. Kozak; Laurence M. Kaplan

(57) ABSTRACT

A method for calculating a distance between a first point and a second point using linear interpolation is provided. The first point and the second point are located between a first latitude and a second latitude. An interpolated prime vertical radius of curvature value for a point between the first point and the second point is calculated based on a first prime vertical radius of curvature value for the first latitude and a second prime vertical radius of curvature value for the second latitude. An interpolated meridian radius of curvature value for the point between the first point and the second point is calculated based on a first meridian radius of curvature value for the first latitude and a second meridian radius of curvature value for the second latitude. An interpolated cosine value for the point between the first point and the second point is calculated based on a value representing a cosine of the first latitude and a value representing a cosine of the second latitude. The distance between the first point and the second point is then calculated based on the interpolated prime vertical radius of curvature value, the interpolated meridian radius of curvature value, and the interpolated cosine value. The use of interpolated prime vertical radius of curvature, meridian radius of curvature, and cosine avoids use of non-linear function evaluation. As a result, the process is efficient and the calculated distances are sufficiently accurate.

36 Claims, 4 Drawing Sheets

METHOD FOR CALCULATING DISTANCE USING PIECE-WISE LINEAR INTERPOLATION

FIELD OF THE INVENTION

The present application relates generally to a method for calculating the distance between two points. The method is particularly useful to the field of navigation systems wherein the accurate and efficient calculation of distances is required.

BACKGROUND OF THE INVENTION

Navigation systems are available for vehicles (such as automobiles, trucks, buses, etc.) that travel on roads. These in-vehicle navigation systems provide end users (such as drivers and/or passengers of the vehicles in which the navigation systems are installed) with various useful navigation features. For example, some navigation systems are able to determine an optimum route to be traveled by roads between locations in a geographic region. Using input from an end user and optionally from equipment that can determine one's physical location (such as a GPS system), programming in the navigation system can examine various routes between two locations to determine an optimum route to travel from a starting location to a destination location in a geographic region. The navigation system may then provide the end user with information about the optimum route in the form of instructions that identify the driving maneuvers required to be taken by the end user to travel from the starting location to the destination location. The instructions may take the form of visual and/or audio instructions that are provided along the way as the end user is travelling the route.

On computer displays that are part of the navigation system hardware, some navigation systems are able to show detailed maps highlighting routes to destinations, the types of maneuvers to be taken along various locations along the routes, the location of certain types of establishments and/or features, etc.

In order to provide these types of features, navigation systems use geographic data. The geographic data may be in the form of one or more databases that include data that represent physical features in a geographic region. The geographic databases include data representing the roads and intersections in a geographic region and also include information relating to the represented roads and intersections, such as turn restrictions at intersections, speed limits along the roads, street name of various roads, address ranges along the roads, etc.

Although navigation systems provide many useful and important features, there continues to be room for improvements in these features. One such area in which there is room for improvement is to use a simplified method of determining the distance between two points accurately and consistently. Difficulties arise in calculating the distance between two points because the earth is not spherical in shape, but instead has an ellipsoidal geometry upon which the navigation databases are based.

Conventional distance calculation techniques include utilizing geodetic formulas that can provide an accurate distance calculation between two points. For example, certain data representing roads and intersections may be expressed in angular units in the WGS84 ellipsoidal coordinates system. Given the latitude and longitude of two points ($\phi_1$, $\lambda_1$) and ($\phi_2$, $\lambda_2$), accuracy in distance of the order of a few millimeters for a line length as long as 200 kilometers can be obtained using the equations 1–12 listed below, and which can be found in the following publication: Geometric Geodesy I, Richard H. Rapp, The Ohio State University, Apr. 1991, pp. 114–115. Equation 12 yields the desired distance between two points after evaluating different quantities as shown in equations 1–11. The notation "a" refers to the semi-major axis of the ellipsoid, while notation "e" refers to the eccentricity of the ellipsoid, wherein the remainder of the notations are self-explanatory, with $e_s$, A, B, C, W, E, F and D in equations 8, 9 and 10 being intermediate quantities present in the following equations and D in equation representing distance between points.

$$e_s^2 = \frac{e^2}{1-e^2} \tag{1}$$

$$A = \sqrt{1 + (e_s^2 \cos^4 \phi_1)} \tag{2}$$

$$B = \sqrt{1 + (e_s^2 \cos^4 \phi_2)} \tag{3}$$

$$C = \sqrt{1 + (e_s^2)} \tag{4}$$

$$w = \frac{A(\lambda_2 - \lambda_1)}{2} \tag{5}$$

$$\Delta\phi = \phi_2 - \phi_1 \tag{6}$$

$$\Delta\lambda = \lambda_2 - \lambda_1 \tag{7}$$

$$D = \frac{\Delta\phi}{2B}\left[1 + \frac{3e_s^2}{4B^2}\Delta\phi\sin\left(2\phi_1 + \frac{2}{3}\Delta\phi\right)\right] \tag{8}$$

$$E = \sin(D)\cos(w) \tag{9}$$

$$F = \frac{1}{A}\sin(w)\left[B\cos\phi_1\cos D - \sin\phi_1\sin D\right] \tag{10}$$

$$\sin\frac{\sigma}{2} = \sqrt{E^2 + F^2} \tag{11}$$

$$D = \frac{aC\sigma}{B^2} \tag{12}$$

As shown above, the equations 1–12 require the evaluation of many non-linear mathematical functions to compute the distance between points. It may not be feasible to perform the evaluation of these non-linear mathematical functions repeatedly where the latitude and longitude of points are constantly changing in certain applications, such as in navigation systems. Also, it is typically not necessary to calculate the distance between points within a few millimeters of accuracy in such applications. Instead, the only requirement is that the distance should be sufficiently accurate for navigation system applications, and that the calculation of such distance should be efficient.

For efficiency, it is necessary to reduce the use of non-linear mathematical functions to the extent possible. As the distances to be determined in conventional navigational system applications are typically not very long, the use of simple formulas and the Pythagorean theorem have been and can be used and still maintain the required level of efficiency and accuracy. Such simple formulas are given below in equations 13–15, although there are certain drawbacks to using these equations as well, which will be discussed below.

$$D_E = N \cos \phi \Delta\lambda \tag{13}$$

$$D_N = M\Delta\phi \tag{14}$$

$$D = \sqrt{D_E^2 + D_N^2} \tag{15}$$

wherein $$\phi = \frac{\phi_1 + \phi_2}{2} \text{ (mean latitude)} \quad (16)$$

$$N = \frac{a}{\sqrt{1 - e^2 \sin^2 \phi}} \quad (17)$$

$$M = \frac{a(1 - e^2)}{\sqrt{(1 - e^2 \sin^2 \phi)^3}} \quad (18)$$

$D_E$ and $D_N$ are east and north components of the distance D between the two points $(\phi_1, \lambda_1)$, and $(\phi_2, \lambda_2)$, $\Delta\phi$ is the difference in the latitude given in equation 6 above, and $\Delta\lambda$ is the difference in the longitude given in equation 7 above. The prime vertical radius of curvature (N) and the meridian radius of curvature (M) are obtained from equations 17 and 18 and, as a result, it is assumed that the earth has an ellipsoidal geometry for the latitude and longitude values in the above formulas. This is required because the latitude and longitude values for a given set of points are based upon the earth having an ellipsoidal geometry. Evaluations of radii of curvature for prime vertical (N) and meridian (M) therefore are performed for the given points in the above formulas. Again, the notation "a" refers to the semi-major axis of the ellipsoid, while notation "e" refers to the eccentricity of the ellipsoid. The prime vertical radius of curvature (N) and the meridian radius of curvature (M) are a function of latitude, and their variations from 0 to 90 degrees is shown in FIG. 1. As a result, equations 13 and 14 cannot be replaced with a model of the earth having a spherical geometry. Moreover, as shown in equation 13, an evaluation for cosine also has to be done, as its value is necessary to determine the east component of the distance between the two points. These values are needed every time the latitude coordinate changes, and a floating-point operation is required to compute these quantities, which is a very time consuming operation that must be performed in the computer of the navigation system a large number of times.

Accordingly, it would be desirable to have a method for calculating the distance between two points for use in navigation system that overcomes the disadvantages described above.

SUMMARY OF THE INVENTION

In order to provide an improved method of calculating the distance between two points for use in a navigation system that overcomes the above-stated disadvantages, one embodiment of the invention provides a method for calculating a distance between a first point and a second point using linear interpolation. The first point and the second point are located between a first latitude and a second latitude. An interpolated prime vertical radius of curvature value for a point between the first point and the second point is calculated based on a predetermined first prime vertical radius of curvature value for the first latitude and a second predetermined prime vertical radius of curvature value for the second latitude. An interpolated meridian radius of curvature value for the point between the first point and the second point is calculated based on a predetermined first meridian radius of curvature value for the first latitude and a second predetermined meridian radius of curvature value for the second latitude. Finally, an interpolated cosine value for the point between the first point and the second point is calculated based on a predetermined value representing a cosine of the first latitude and a predetermined value representing a cosine of the second latitude. The interpolated prime vertical radius of curvature value, the interpolated meridian radius of curvature value, and the interpolated cosine value can then be used in linear equations to determine the distance between the two points. This method eliminates the evaluation of non-linear functions thereby increasing efficiency and also maintaining accuracy.

Another embodiment of the invention provides a computer readable medium including a program for calculating a distance between a first point and a second point using linear interpolation. The first point and the second point are located between a first latitude and a second latitude. The program includes computer readable program code that calculates an interpolated prime vertical radius of curvature value for a point between the first point and the second point based on a first prime vertical radius of curvature value for the first latitude and a second prime vertical radius of curvature value for the second latitude. The program also includes computer readable program code that calculates an interpolated meridian radius of curvature value for the point between the first point and the second point based on a first meridian radius of curvature value for the first latitude and a second meridian radius of curvature value for the second latitude. In addition, the program includes computer readable program code that calculates an interpolated cosine value for the point between the first point and the second point based on a value representing a cosine of the first latitude and a value representing a cosine of the second latitude. Finally, the program includes computer readable program code that calculates the distance between the first point and the second point based on the interpolated prime vertical radius of curvature value, the interpolated meridian radius of curvature value, and the interpolated cosine value.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

As discussed above, one major drawback to calculating the distance between two points by evaluating equations 13–18 above is that the prime vertical radius of curvature (N), the meridian radius of curvature (M), and the cosine function are non-linear parameters that must be calculated via a time consuming floating point operation every time the latitude coordinate changes. As a result, evaluating equations 13–18 may not provide an efficient means to calculate distances for use in navigation systems.

Figure 1:
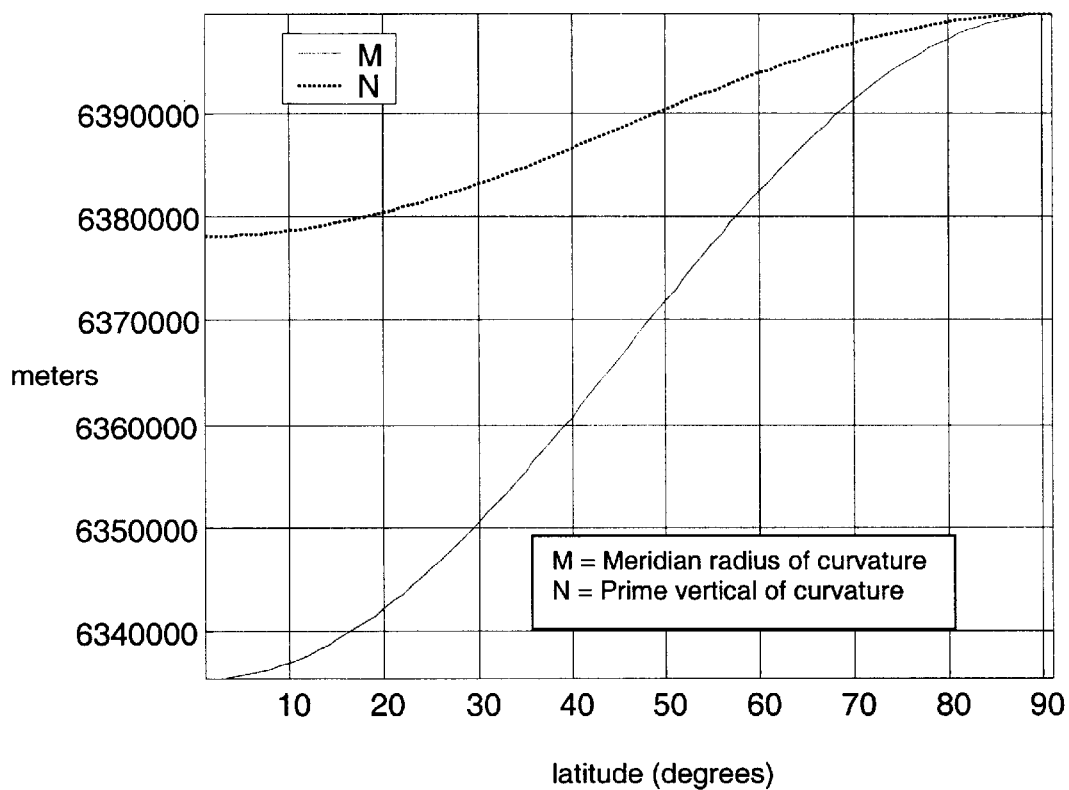
FIG. 1 is a graph illustrating the variation between the prime vertical radius of curvature (N) and the meridian radius of curvature (M) from 0–90 degrees.
Figure 2:
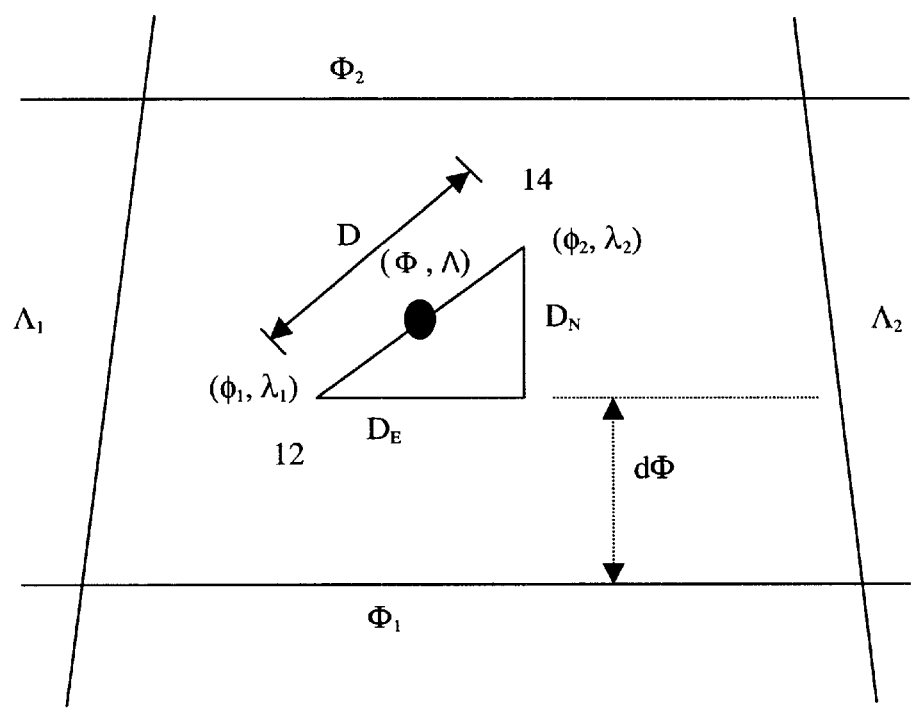
FIG. 2 is a diagram illustrating the various quantities used to calculate the distance between two points using linear interpolation in accordance with the present invention.
Figure 4:
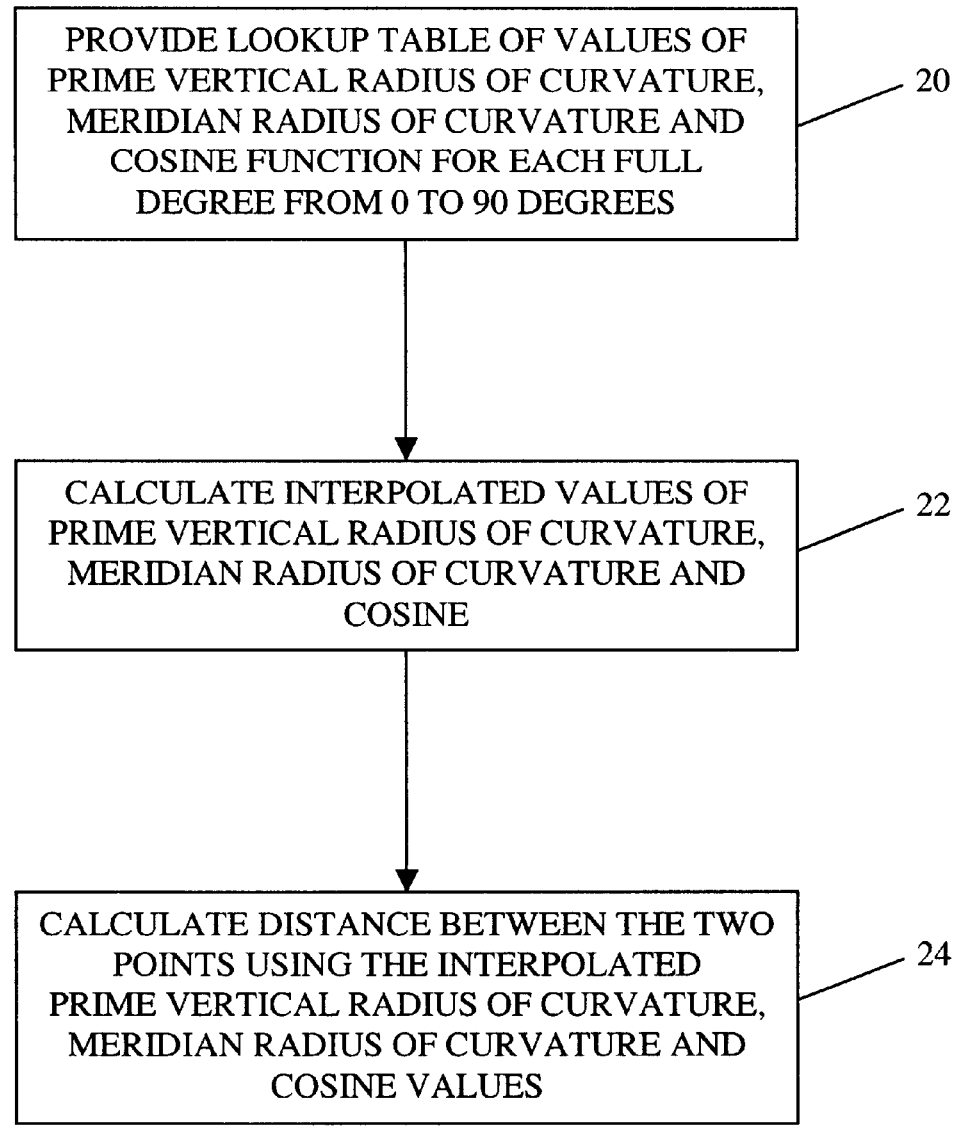
FIG. 4 is a flow chart of the method for calculating the distance between two points using linear interpolation in accordance with the present invention.

Referring now to FIG. 2 and FIG. 4, an embodiment of the present invention is directed to providing a method for determining the distance D between the two points ($\phi_1$, $\lambda_1$) and ($\phi_2$, $\lambda_2$) without having to calculate non-liner parameters for each and every distance calculation. This is accomplished by piece-wise linear interpolation, which is defined herein as estimating values of a particular parameter between two known values of that parameter. In a preferred embodiment, the prime vertical radius of curvature (N), the meridian radius of curvature (M), and the cosine function are calculated by means of linear interpolation. In order to accomplish this, the values for the prime vertical radius of curvature (N), the meridian radius of curvature (M), and the cosine function are calculated for different interval of latitude (for example each full degree of latitude from 0 to 90 degrees). These numbers are tabulated and then stored in any suitable format such as, for example, a look-up table (step 20 of FIG. 4). These stored numbers can then be used in the linear equations discussed below to calculate the interpolated values for the prime vertical radius of curvature (N), the meridian radius of curvature (M), and the cosine function for the required point.

FIG. 2 illustrates the relative position of a first point 12 having an associated latitude and longitude ($\phi_1$, $\lambda_1$) and a second point 14 having an associated latitude and longitude ($\phi_2$, $\lambda_2$). In the embodiment shown, for example, the two points ($\phi_1$, $\lambda_1$), ($\phi_2$, $\lambda_2$) are positioned above a first latitude $\Phi_1$, and below second latitude $\Phi_2$. In particular, $\Phi_1$ refers to the latitude south of $\phi_1$. Similarly, $\Phi_2$ refers to the latitude north of $\phi_2$. The two points ($\phi_1$, $\lambda_1$), ($\phi_2$, $\lambda_2$) also are positioned between a first longitude $\Lambda_1$ and a second longitude $\Lambda_2$. In particular, $\Lambda_1$ refers to the longitude to the west of $\lambda_1$. Similarly, $\Lambda_2$ refers to the longitude east of $\lambda_2$. $D_E$ is the east components of the distance D between points ($\phi_1$, $\lambda_1$) and ($\phi_2$, $\lambda_2$) and Dr, is the north component of the distance D between points ($\phi_1$, $\lambda_1$) and ($\phi_2$, $\lambda_2$). A preferred embodiment of the present invention utilizes the following equations to calculate the distances $D_E$ and $D_N$ shown in FIG. 2.

$$D_E = N_\Phi \cos_\Phi \Delta\lambda \qquad (19)$$

$$D_N = M_\Phi \Delta_\phi \qquad (20)$$

The distance D between points 12 and 14 can then be calculated using the Pythagorean theorem as follows.

$$D = \sqrt{D_E^2 + D_N^2} \qquad (21)$$

It should be noted that equations 19–21 are the same as equations 13–15 described above, except that equations 19–21 utilize interpolated values for the prime vertical radius of curvature (N), the meridian radius of curvature (M), and the cosine function, as will be more fully described below. The interpolated values are indicated in equations 19–21 as $N_\Phi$, $M_\Phi$ and $\cos_\Phi$. The $\Delta\lambda$ symbol represents the difference between the longitude $\lambda_2$ of the second point ($\phi_2$, $\lambda_2$) and the longitude $\lambda_1$ of the first point ($\phi_1$, $\lambda_1$). Similarly, $\Delta\phi$ represents the difference between the latitude $\phi_2$ of the second point ($\phi_2$, $\lambda_2$) and the latitude $\phi_1$ of the first point ($\phi_1$, $\lambda_1$).

As stated above, the values for the prime radius of curvature (N), the meridian radius of curvature (M), and the cosine function are calculated for each full degree of latitude from 0 to 90 degrees and are stored in any suitable format such as, for example, a look-up table. Although in the preferred embodiment the values for (N), (M), and the cosine function are evaluated at each full degree, it should be appreciated tat these values may be calculated at any suitable interval of latitude. These tabulated values, referred to below as $N_{\Phi 2}$, $N_{\Phi 1}$, $M_{\Phi 2}$, $M_{\Phi 1}$, $\cos_{\Phi 2}$, and $\cos_{\Phi 1}$, can be used in the following simple equations to interpolate the respective values for the required point ($\Phi$, $\Lambda$), thereby avoiding evaluating non-liner functions every time for accuracy and efficiency (see step 22 of FIG. 4).

$$d_\Phi = \phi_1 - \Phi_1 \qquad (22)$$

$$\cos_\Phi = \cos_{\Phi 1} + (\cos_{\Phi 2} - \cos_{\Phi 1}) d_\Phi \qquad (23)$$

$$N_\Phi = N_{\Phi 1} + (N_{\Phi 2} - N_{\Phi 1}) d_\Phi \qquad (24)$$

$$M_\Phi = M_{\Phi 1} + (M_{\Phi 2} - M_{\Phi 1}) d_\Phi \qquad (25)$$

As shown HG. 2, d$\Phi$ is equal to the difference between the latitude A of the first point ($\phi_1$, $\lambda_1$) and the latitude $\Phi_1$ south of $\phi_1$. These interpolated values $N_\Phi$, $M_\Phi$, and $\cos_\Phi$ can then be used to calculate required distance by plugging them in the simple equations 19–21 above (see step 24 of FIG. 4). As noted above, the equations 19–21 are same as equations 13–15 above, except that equations 19–21 use interpolated values for N, M, and the cosine function. The various symbols used in equations 19–25 are illustrated and shown in FIG. 2.

Those of ordinary skill in the art will appreciate that the method of calculating the distance between two points using the linear interpolation method described above could be used to calculate the distance of very long routes. In particular, a long route may preferably be a set of segments of small length as is the case in the navigation database. The length of each of the segments may be determined using the linear interpolation method described above. The total length of the route may then be obtained by simply adding together the lengths of each of the segments. This will achieve both accuracy and efficiency.

Figure 3:
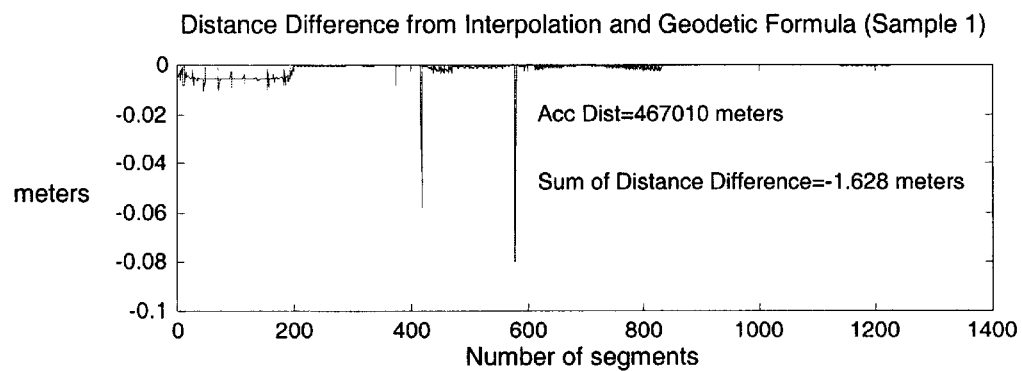
FIG. 3 is a diagram illustrating the difference in accuracy between the distance calculation using conventional geodetic formula set forth in equations 1–12 and the distance calculation using linear interpolation in accordance with the present invention (equations 19–25 below).
Figure 3:
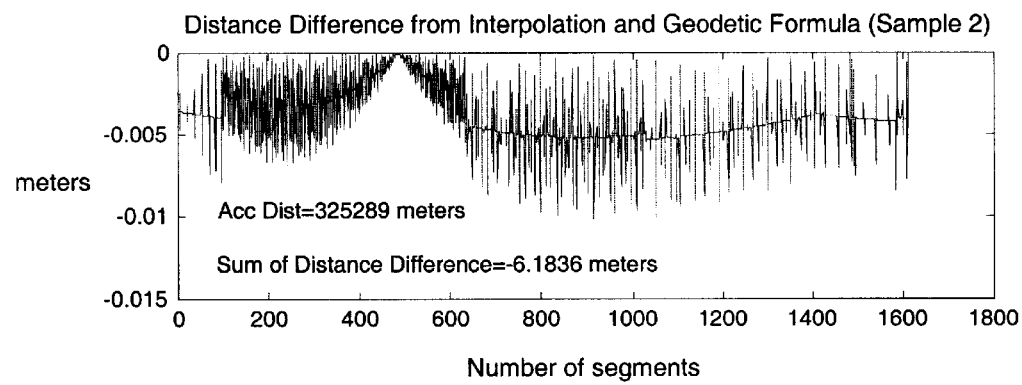

The accuracy of the linear interpolation method described in equations 19–25 as compared to the geodetic formula given above in equations 1–12 is illustrated in FIG. 3. Two sample set of points were evaluated as tests. Each set of points represented a line having a number of individual segments. Distances were calculated for each individual line using the geodetic formula given above (equations 1–12) and the linear interpolation formula (equations 19–25). Differences of calculated distance between the two methods for individual segments were derived. These results are shown in the top and bottom panels of FIG. 3. The results show that the differences between the distances using the geodetic formula given above (equations 1–12) and the linear interpolation formula (equations 19–25) are very small. The sum of all the distances was also obtained from both methods, which is also shown in FIG. 3 in text. The distance between the two methods is within a few meters in distance for a total line length of more than 300 kilometers in both cases. The results show that it is possible to obtain a very accurate distance using the present linear interpolation method.

As demonstrated above, the present embodiment eliminates computation of all non-linear functions by using tabulated values for $N_{\Phi 2}$, $N_{\Phi 1}$, $M_{\Phi 2}$, $M_{\Phi 1}$, $\cos_{\Phi 2}$, and $\cos_{\Phi 1}$ and a simple linear interpolation method to get the values for $N_\Phi$, $M_\Phi$, and $\cos_\Phi$ for required point ($\Phi$, $\Lambda$) (see FIG. 2). Required accuracy for distance calculations for use in a navigation system can be maintained using this method. The values for $N_\Phi$, $M_\Phi$, and the $Cos_\Phi$ function for required point $(\Phi,\Lambda)$ can be obtained with sufficient accuracy using the linear interpolation method described above from the tabulated values for N, M, and cosine based on whole number of degrees of latitude from 0 to 90 degrees. To keep the table of the cosine values accurate enough and relatively manageable in size, the cosine values may preferably be truncated to an appropriate number such as, for example, 4, 5, or 6 numbers after the decimal point.

The linear interpolation method described above may preferably use the parameters of WGS84 ellipsoid to calculate radii of curvature values for M and N. Use of integer arithmetic can also be applied by multiplying the tabulated cosine values by 1000000 when cosine values are truncated to the $6^{th}$ decimal place.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method performed by a computing platform for calculating a distance between a first point and a second point in a geographic region using linear interpolation, the first point and the second point located between a first latitude and a second latitude comprising:
   providing the first point and the second point to the computing platform;
   calculating an interpolated prime vertical radius of curvature value for a point between the first point and the second point based on a first prime vertical radius of curvature value for the first latitude and a second prime vertical radius of curvature value for the second latitude;
   calculating an interpolated meridian radius of curvature value for the point between the first point and the second point based on a first meridian radius of curvature value for the first latitude and a second meridian radius of curvature value for the second latitude;
   calculating an interpolated cosine value for the point between the first point and the second point based on a value representing a cosine of the first latitude and a value representing a cosine of the second latitude; and
   calculating the distance between the first point and the second point based on the interpolated prime vertical radius of curvature value, the interpolated meridian radius of curvature value, and the interpolated cosine value.

2. The method of claim 1 further comprising:
   determining the first prime vertical radius of curvature value for the first latitude;
   determining the second prime vertical radius of curvature value for the second latitude;
   determining the first meridian radius of curvature value for the first latitude;
   determining the second meridian radius of curvature value for the second latitude;
   determining the value representing the cosine of the first latitude; and
   determining the value representing the cosine of the second latitude.

3. The method of claim 2 further comprising:
   storing the first prime vertical radius of curvature value for the first latitude;
   storing the second prime vertical radius of curvature value for the second latitude;
   storing the first meridian radius of curvature value for the first latitude;
   storing the second meridian radius of curvature value for the second latitude;
   storing the value representing the cosine of the first latitude; and
   storing the value representing the cosine of the second latitude.

4. The method of claim 1 wherein the first point has an associated latitude and longitude and the second point has an associated latitude and longitude and further comprising:
   calculating the difference between the latitude of the first point and the first latitude.

5. The method of claim 4 further comprising:
   calculating the difference between the second prime vertical radius of curvature value for the second latitude and the first prime vertical radius of curvature value for the first latitude;
   multiplying the difference between the second prime vertical radius of curvature value for the second latitude and the first prime vertical radius of curvature value for the first latitude by the difference between the latitude of the first point and the first latitude to obtain a first value; and
   adding the first prime vertical radius of curvature value for the first latitude to the first value to obtain the interpolated prime vertical radius of curvature value.

6. The method of claim 4 further comprising;
   calculating the difference between the second meridian radius of curvature value for the second latitude and the first meridian radius of curvature value for the first latitude;
   multiplying the difference between the second meridian radius of curvature value for the second latitude and the first meridian radius of curvature value for the first latitude by the difference between the latitude of the first point and the first latitude to obtain a second value; and
   adding the first meridian radius of curvature value for the first latitude to the second value to obtain the interpolated meridian radius of curvature value.

7. The method of claim 4 further comprising:
   calculating the difference between the value representing the cosine of the second latitude and the value representing the cosine of the first latitude;
   multiplying the difference between the value representing the cosine of the second latitude and the value representing the cosine of the first latitude by the difference between the latitude of the first point and the first latitude to obtain a third value; and
   adding the value representing the cosine of the first latitude to the third value to obtain the interpolated cosine value.

8. The method of claim 1 further comprising:
   calculating an east component of the distance between the first and second points based on the interpolated prime vertical radius of curvature value and the interpolated cosine value.

9. The method of claim 8 further comprising:
   calculating the difference between the longitude of the second point and the longitude of the first point; and
   multiplying the difference between longitude of the second point and the longitude of the first point by the interpolated cosine value and by the interpolated prime vertical radius of curvature value to obtain the east component of the distance between the first and second points.

10. The method of claim 9 further comprising:
calculating a north component of the distance between the first and second points based on the interpolated meridian radius of curvature value.

11. The method of claim 10 further comprising:
calculating the difference between the latitude of the second point and the latitude of the first point; and
multiplying the difference between latitude of the second point and the latitude of the first point by the interpolated meridian radius of curvature value to obtain the north component of the distance between the first and second points.

12. The method of claim 11 further comprising;
calculating the square of the east component of the distance between the first and second points;
calculating the square of the north component of the distance between the first and second points;
adding the square of the east component of the distance between the first and second points to the square of the north component of the distance between the first and second points to obtain a sum of the east and north components;
calculating the square root of the sum of the east and north components to obtain the distance between the first and second points.

13. The method of claim 1 wherein the point between the first point and the second point is a midpoint between the first and second points.

14. The method of claim 1 wherein the first latitude and the second latitude and separated by an integer multiple of approximately one degree.

15. The method of claim 1 further comprising:
providing a navigation system wherein the distance between the first point and the second point is calculated by the navigation system.

16. A computer readable medium including a program for calculating a distance between a first point and a second point using linear interpolation, the first point and the second point located between a first latitude and a second latitude, the program comprising:
computer readable program code that accesses location information of the first point and the second point;
computer readable program code that calculates an interpolated prime vertical radius of curvature value for a point between the first point and the second point based on a first prime vertical radius of curvature value for the first latitude and a second prime vertical radius of curvature value for the second latitude;
computer readable program code that calculates an interpolated meridian radius of curvature value for the point between the first point and the second point based on a first meridian radius of curvature value for the first latitude and a second meridian radius of curvature value forte second latitude;
computer readable program code that calculates an interpolated cosine value for the point between the first point and the second point based on a value representing a cosine of the first latitude and a value representing a cosine of the second latitude; and
computer readable program code that calculates the distance between the first point and the second point based on the interpolated prime vertical radius of curvature value, the interpolated meridian radius of curvature value, and the interpolated cosine value.

17. The computer readable medium of claim 16 further comprising computer readable program code that:
determines the first prime vertical radius of curvature value forte first latitude;
determines the second prime vertical radius of curvature value for the second latitude;
determines the first meridian radius of curvature value for the first latitude;
determines the second meridian radius of curvature value for the second latitude;
determines the value representing the cosine of the first latitude; and
determines the value representing the cosine of the second latitude.

18. The computer readable medium of claim 17 further comprising computer readable program code that:
stores the first prime vertical radius of curvature value forte first latitude;
stores the second prime vertical radius of curvature value for the second latitude;
stores the first meridian radius of curvature value for the first latitude;
stores the second meridian radius of curvature value for the second latitude;
stores the value representing the cosine of the first latitude; and
stores the value representing the cosine of the second latitude.

19. The computer readable medium of claim 16 wherein the first point has an associated latitude and longitude and the second point has an associated latitude and longitude and further comprising computer readable program code that calculates the difference between the latitude of the first point and the first latitude.

20. The computer readable medium of claim 19 further comprising computer readable program code that:
calculates the difference between the second prime vertical radius of curvature value for the second latitude and the first prime vertical radius of curvature value for the first latitude;
multiplies the difference between the second prime vertical radius of curvature value for the second latitude and the first prime vertical radius of curvature value for the first latitude by the difference between the latitude of the first point and the first latitude to obtain a first value; and
adds the first prime, vertical radius of curvature value for the first latitude to the first value to obtain the interpolated prime vertical radius of curvature value.

21. The computer readable medium of claim 19 further comprising computer readable program code that:
calculates the difference between the second meridian radius of curvature value for the second latitude and the first meridian radius of curvature value for the first latitude;
multiplies the difference between the second meridian radius of curvature value for the second latitude and the first meridian radius of curvature value for the first latitude by the difference between the latitude of the first point and the first latitude to obtain a second value; and adds the first meridian radius of curvature value for the first latitude to the second value to obtain the interpolated meridian radius of curvature value.

22. The computer readable medium of claim 19 further comprising computer readable program code that:
    calculates the difference between the value representing the cosine of the second latitude and the value representing the cosine of the first latitude;
    multiplies the difference between the value representing the cosine of the second latitude and the value representing the cosine of the first latitude by the difference between the latitude of the first point and the first latitude to obtain a third value; and
    adds the value representing the cosine of the first latitude to the third value to obtain the interpolated cosine value.

23. The computer readable medium of claim 16 further comprising computer readable program code that calculates an east component of the distance between the first and second points based on the interpolated prime vertical radius of curvature value and the interpolated cosine value.

24. The computer readable medium of claim 23 further comprising computer readable program code that:
    calculates the difference between the longitude of the second point and the longitude of the first point; and
    multiplies the difference between longitude of the second point and the longitude of the first point by the interpolated cosine value and by the interpolated prime vertical radius of curvature value to obtain the east component of the distance between the first and second points.

25. The computer readable medium of claim 24 further comprising computer readable program code that calculates a north component of the distance between the first and second points based on the interpolated meridian radius of curvature value.

26. The computer readable medium of claim 25 further comprising computer readable program code that:
    calculates the difference between the latitude of the second point and the latitude of the first point; and
    multiplies the difference between latitude of the second point and the latitude of the first point by the interpolated meridian radius of curvature value to obtain the north component of the distance between the first and second points.

27. The computer readable medium of claim 26 further comprising computer readable program code that:
    calculates the square of the east component of the distance between the first and second points;
    calculates the square of the north component of the distance between the first and second points;
    adds the square of the cast component of the distance between the first and second points to the square of the north component of the distance between the first and second points to obtain a sum of the east and north components;
    calculates the square root of the sum of the east and north components to obtain the distance between the first and second points.

28. The computer readable medium of claim 16 wherein the point between the first point and the second point is a midpoint between the first and second points.

29. The computer readable medium of claim 16 wherein the first latitude and the second latitude and separated by an integer multiple of approximately one degree.

30. A method performed by a computing platform for calculating a distance between a first point and a second point in a geographic region, the first point and the second point located between a first latitude and a second latitude comprising:
    providing the first point and the second point to the computing platform;
    calculating an estimated prime vertical radius of curvature value for a point between the first point and the second point based on a first prime vertical radius of curvature value for the first latitude and a second prime vertical radius of curvature value for the second latitude;
    calculating an estimated meridian radius of curvature value for the point between the first point and the second point based on a first meridian radius of curvature value for the first latitude and a second meridian radius of curvature value for the second latitude;
    calculating an estimated cosine value for the point between the first point and the second point based on a value representing a cosine of the first latitude and a value representing a cosine of the second latitude; and
    calculating the distance between the first point and the second point based on the estimated prime vertical radius of curvature value, the estimated meridian radius of curvature value, and the estimated cosine value.

31. A method performed by a computing platform for calculating a distance between a first point and a second point in a geographic region using liner interpolation comprising:
    preparing a lookup table of stored values, the stored values including prime vertical radius of curvature values for a selected interval of latitude, meridian radius of curvature values for the selected interval of latitude, and cosine function values for the selected interval of latitude wherein the computing platform accesses the stored values to calculate the distance between the first point and the second point using linear interpolation.

32. A method for calculating a distance between a first point and a second point using linear interpolation comprising:
    providing a navigation system;
    providing a lookup table of stored values, the stored values including prime vertical radius of curvature values for a selected interval of latitude, meridian radius of curvature values for the selected interval of latitude, and cosine function values for the selected interval of latitude; and
    storing the lookup table in the navigation system to allow the navigation system to calculate the distance between the first point and the second point using linear interpolation.

33. A navigation system for calculating a distance between a first point and a second point using linear interpolation comprising:
    a lookup table of stored values, the stored values including prime vertical radius of curvature values for a selected interval of latitude, meridian radius of curvature values for the selected interval of latitude, and cosine function values for the selected interval of latitude wherein the navigation system uses the lookup table of stored values to calculate the distance between the first point and the second point using linear interpolation.

34. A computer readable medium for use in calculating a distance between a first point and a second point using linear interpolation comprising:

a lookup table of stored values, the stored values including prime vertical radius of curvature values for a selected interval of latitude, meridian radius of curvature values for the selected interval of latitude, and cosine function values for the selected interval of latitude, to allow a navigation system to use the lookup table of stored values to calculate the distance between the first point and the second point using linear interpolation.

35. A method for calculating a distance between a first point and a second point using linear interpolation comprising:

providing a lookup table of stored values, the stored values including prime vertical radius of curvature values for a selected interval of latitude, meridian radius of curvature values for the selected interval of latitude, and cosine function values for the selected interval of latitude; and compiling a geographic database that includes stored values for distances between points using the lookup table of stored values.

36. The invention of claim 31, 32, 33, 34, or 35 wherein the selected interval of latitude is approximately 1 degree.

\* \* \* \* \*